(12) United States Patent
Kim et al.

(10) Patent No.: US 9,178,672 B2
(45) Date of Patent: Nov. 3, 2015

(54) APPARATUS AND METHOD FOR CONTROLLING INTER-CELL INTERFERENCE IN WIRELESS COMMUNICATION SYSTEM

(71) Applicants: LG Electronics Inc., Seoul (KR); INDUSTRY-ACADEMIC COOPERATION FOUNDATION, YONSEI UNIVERSITY, Seoul (KR)

(72) Inventors: Jihwan Kim, Daejeon (KR); Byounghoon Kim, Anyang-si (KR); Jeonghoon Mo, Seoul (KR); Jeongho Kwak, Daejeon (KR); Jaewon Lim, Anyang-si (KR); Song Chong, Daejeon (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 111 days.

(21) Appl. No.: 14/055,589

(22) Filed: Oct. 16, 2013

(65) Prior Publication Data
US 2014/0105138 A1    Apr. 17, 2014

Related U.S. Application Data

(60) Provisional application No. 61/715,263, filed on Oct. 17, 2012.

(51) Int. Cl.
*H04W 4/00* (2009.01)
*H04L 5/00* (2006.01)
*H04W 74/08* (2009.01)
*H04W 72/12* (2009.01)
*H04W 52/24* (2009.01)
*H04W 52/02* (2009.01)

(52) U.S. Cl.
CPC ......... *H04L 5/0032* (2013.01); *H04W 72/1226* (2013.01); *H04W 74/0808* (2013.01); *H04W 52/0216* (2013.01); *H04W 52/244* (2013.01)

(58) Field of Classification Search
CPC ................... H04W 74/0808; H04W 72/1226; H04W 52/0216; H04L 5/00
USPC ....................................................... 370/329
See application file for complete search history.

(56) References Cited

U.S. PATENT DOCUMENTS

2004/0146019 A1 * 7/2004 Kim et al. ...................... 370/329
2010/0067411 A1 * 3/2010 Shinozaki ..................... 370/280

\* cited by examiner

*Primary Examiner* — Sai-Ming Chan
(74) *Attorney, Agent, or Firm* — Lee, Hong, Degerman, Kang & Waimey (57) ABSTRACT

A method for controlling inter-cell interference in a wireless communication system includes receiving information about an interference control period from a central controller, performing carrier sensing based activation competition in the interference control period, and scheduling user equipments served by the BS if the BS wins the carrier sensing based activation competition. The carrier sensing based activation competition may be based on a BS-specific back-off value related to a BS-specific weight. The BS-specific weight may be determined as the sum of products of an instantaneous throughput and a differential value of an average throughput based utility function, for all UEs served by the BS.

18 Claims, 5 Drawing Sheets

APPARATUS AND METHOD FOR CONTROLLING INTER-CELL INTERFERENCE IN WIRELESS COMMUNICATION SYSTEM

Pursuant to 35 U.S.C. §119(e), this application claims the benefit of U.S. Provisional Application Ser. No. 61/715,263, filed on Oct. 17, 2012, the contents of which are hereby incorporated by reference herein in their entirety.

BACKGROUND OF THE INVENTION

1. Field of the Invention

The present invention relates to a wireless communication system, and more specifically, to an apparatus and method for controlling inter-cell interference.

2. Discussion of the Related Art

Binary Power Control (BPC)

Methods for mitigating inter-cell interference in a cellular network include a method of controlling transmit power, a method of dividing a frequency used between cells, a method of dividing a sector, etc. The method of controlling transmit power reduces transmit power when a cell applies severe interference to a neighboring cell to mitigate the interference and increases the transmit power when the cell applies insignificant interference to the neighboring cell to enable high-throughput transmission to a UE of the cell.

Recent researches has determined that a method of setting one of minimum power and maximum power as transmit power or determining transmit power as an on/off state is the best control method to maximize capacity of multi-cell network (maximize a utility function as necessary). This method is called binary power control (BPC). A method of defining an on/off state of each base station as a pattern on the basis of BPC and a resource allocation method for scheduling UEs at a base station that is on in the defined pattern have been proposed.

Almost Blank Subframe (ABS)

In LTE-A, a slot of 0.5 ms includes 6 or 7 symbols and 12 subcarriers (180 KHz) and a 1 ms subframe consisting of 2 slots is a minimum resource allocation unit. 10 subframes form a frame.

In LTE-A, a base station does not transmit data to a UE during one subframe, which is called an almost blank subframe (ABS), in order to eliminate inter-cell interference in the time domain. For example, the ABS is used in such a manner that ABSs are provided during aggressor cell transmission that causes inter-cell interference such that a victim cell has high throughput at a low interference level.

SUMMARY OF THE INVENTION

Accordingly, the present invention is directed to a method for efficiently controlling inter-cell interference in a wireless communication system, which substantially obviates one or more problems due to limitations and disadvantages of the related art.

The technical problems solved by the present invention are not limited to the above technical problems and those skilled in the art may understand other technical problems from the following description.

To achieve these objects and other advantages and in accordance with the purpose of the invention, as embodied and broadly described herein, a method for controlling inter-cell interference in a wireless communication system, which is performed by a base station (BS), the method including: receiving information about an interference control period from a central controller; performing carrier sensing based activation competition in the interference control period; and scheduling user equipments served by the BS if the BS wins the carrier sensing based activation competition, wherein the carrier sensing based activation competition is based on a BS-specific back-off value related to a BS-specific weight.

Preferably, the BS-specific back-off value may be randomly selected in a period having a specific length, wherein the period having the specific length decreases as the BS-specific weight increases.

Preferably, the period may be $(0, 2\lambda_m)$ wherein $\lambda_m$ is a BS-specific value, $\lambda_m = e^{-w_m(\tau)}$ and $w(\tau)$ corresponds to the BS-specific weight in a superframe $\tau$.

Preferably, the BS-specific weight may be determined as the sum of products of instantaneous throughput and the differential value of an average throughput based utility function, for all UEs served by the BS.

Preferably, the BS-specific weight may be determined as $$w(\tau) = \sum_{n \in N} U'(\overline{R}_n) r_{n,PS},$$

wherein $w(\tau)$ denotes the BS-specific weight in a superframe $\tau$, N denotes a set of UEs served by the BS, n represents a UE in the UE set, $$U(\overline{R}_n) = \begin{cases} \log(\overline{R}_n), & \text{if } \alpha = 1, \\ (1-\alpha)\overline{R}_n^{1-\alpha}, & \text{otherwise}, \end{cases}$$

$\overline{R}_n$ represents the average throughput of the UE (n), $\alpha$ is a constant and $r_{n,PS}$ is the instantaneous throughput of the UE (n) in the interference control period.

Preferably, the performing of the carrier sensing based activation competition may include determining whether the intensity of a reference signal received from a neighboring BS exceeds a threshold value, wherein, if the intensity of the reference signal received from the neighboring BS does not exceed the threshold value for a time corresponding to the BS-specific back-off value, it is determined that the BS wins the activation competition.

Preferably, if at least one neighboring BS is defeated in the carrier sensing based activation competition, the at least one neighboring BS may maintain an idle state.

Preferably, the information about the interference control period may be determined on the basis of information about gradients of utility function in a period in which interference control of each BS is performed (hereinafter, "control period") and a period in which interference control is not performed (hereinafter, "no-control period"), wherein the interference control period is determined such that one having a higher gradient between the control period and the no-control period is set more frequently in the interference control period.

Preferably, the information about the gradient of utility function of a BS (m) in the period in which interference control is performed may correspond to $\Delta_{m,PS} = \sum_{n \in N_m} U'(\overline{R}_n) r_{n,PS}$, and information about the gradient of utility function of the BS (m) in the period in which interference control is not performed may correspond to $\Delta_{m,NPS} = \sum_{n \in N_m} U'$ $(\bar{R}_n)r_{n,NPS}$, wherein $N_m$ denotes a set of UEs served by the BS (m), n denotes a UE in the UE set, $$U(\bar{R}_n) = \begin{cases} \log(\bar{R}_n), & \text{if } \alpha = 1, \\ (1-\alpha)\bar{R}_n^{1-\alpha}, & \text{otherwise,} \end{cases}$$

$\bar{R}_n$ is the average throughput of the UE (n), $\alpha$ is a constant, $r_{n,PS}$ is an instantaneous throughput of the UE (n) in the period in which interference control is performed, and $r_{n,NPS}$ is an instantaneous throughput of the UE (n) in the period in which interference control is not performed.

Preferably, the period $\theta$ in which interference control is performed and the period $1-\theta$ in which interference control is not performed may be updated as $$\theta \leftarrow \frac{\theta + \gamma \sum_m \Delta_{m,PS}}{1 + \gamma \sum_m (\Delta_{m,NPS} + \Delta_{m,PS})},$$

$$1 - \theta \leftarrow \frac{1 - \theta + \gamma \sum_m \Delta_{m,NPS}}{1 + \sum_m \gamma(\Delta_{m,NPS} + \Delta_{m,PS})},$$

wherein $\gamma$ is a scaling factor and $0 < \gamma \ll 1$.

In another aspect of the present invention, provided herein is a BS for controlling inter-cell interference in a wireless communication system, the BS including: a radio frequency (RF) unit; and a processor configured to control the RF unit.

The processor is configured to receive information about an interference control period from a central controller, to perform carrier sensing based activation competition in the interference control period and to schedule user equipments served by the BS if the BS wins the carrier sensing based activation competition, wherein the carrier sensing based activation competition is based on a BS-specific back-off value related to a BS-specific weight.

The BS-specific back-off value may be randomly selected in a period having a specific length, wherein the period having the specific length decreases as the BS-specific weight increases.

Preferably, the period may be $(0, 2\lambda_m)$ wherein $\lambda_m$ is a BS-specific value, $\lambda_m = e^{-w_m(\tau)}$ and $w(\tau)$ corresponds to the BS-specific weight in a superframe $\tau$.

Preferably, the BS-specific weight may be determined as the sum of products of an instantaneous throughput and a differential value of an average throughput based utility function, for all UEs served by the BS.

Preferably, the BS-specific weight may be determined as $$w(\tau) - \sum_{n \in N} U'(\bar{R}_n) r_{n,PS},$$

wherein $w(\tau)$ denotes the BS-specific weight in a superframe $\tau$, N denotes a set of UEs served by the BS, n represents a UE in the UE set, $$U(\bar{R}_n) = \begin{cases} \log(\bar{R}_n), & \text{if } \alpha = 1, \\ (1-\alpha)\bar{R}_n^{1-\alpha}, & \text{otherwise,} \end{cases}$$

$\bar{R}_n$ represents the average throughput of the UE (n), $\alpha$ is a constant and $r_{n,PS}$ is the instantaneous throughput of the UE (n) in the interference control period.

Preferably, the processor may be configured to determine whether the intensity of a reference signal received from a neighboring BS exceeds a threshold value, wherein, if the intensity of the reference signal received from the neighboring BS does not exceed the threshold value for a time corresponding to the BS-specific back-off value, it is determined that the BS wins the activation competition.

Preferably, if at least one neighboring BS is defeated in the carrier sensing based activation competition, the at least one neighboring BS may maintain an idle state.

Preferably, the information about the interference control period may be determined based on information about gradient of utility function in a period in which interference control is performed (hereinafter, "control period") and gradient of utility function in a period in which interference control is not performed (hereinafter, "no-control period"), wherein the interference control period is determined such that one having a higher gradient between the control period and the no-control period is set more frequently in the interference control period.

Information about the gradient of utility function of a BS (m) in the period in which interference control is performed may correspond to $\Delta_{m,PS} = \Sigma_{n \in N_m} U'(\bar{R}_n) r_{n,PS}$, and information about the gradient of utility function of the BS (m) in the period in which interference control is not performed may correspond to $\Delta_{m,NPS} = \Sigma_{n \in N_m} U'(\bar{R}_n) r_{n,NPS}$, wherein $N_m$ denotes a set of UEs served by the BS (m), n denotes a UE in the UE set, $$U(\bar{R}_n) = \begin{cases} \log(\bar{R}_n), & \text{if } \alpha = 1, \\ (1-\alpha)\bar{R}_n^{1-\alpha}, & \text{otherwise,} \end{cases}$$

$\bar{R}_n$ is the average throughput of the UE (n), $\alpha$ is a constant, $r_{n,PS}$ is instantaneous throughput of the UE (n) in the period in which interference control is performed, and $r_{n,NPS}$ is instantaneous throughput of the UE (n) in the period in which interference control is not performed.

The period $\theta$ in which interference control is performed and the period $1-\theta$ in which interference control is not performed may be updated as $$\theta \leftarrow \frac{\theta + \gamma \sum_m \Delta_{m,PS}}{1 + \gamma \sum_m (\Delta_{m,NPS} + \Delta_{m,PS})}, 1 - \theta \leftarrow \frac{1 - \theta + \gamma \sum_m \Delta_{m,NPS}}{1 + \sum_m \gamma(\Delta_{m,NPS} + \Delta_{m,PS})},$$

wherein $\gamma$ is a scaling factor and $0 < \gamma \ll 1$.

According to embodiments of the present invention, inter-cell interference can be controlled more efficiently in a wireless communication system. Furthermore, data throughput of a specific UE can be enhanced through inter-cell interference control and UE fairness can be improved.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The embodiments of the present invention are applicable to a variety of wireless access systems such as CDMA (code division multiple access), FDMA (frequency division multiple access), TDMA (time division multiple access), OFDMA (orthogonal frequency division multiple access), SC-FDMA (single carrier frequency division multiple access, etc. CDMA can be implemented as a radio technology such as UTRA (universal terrestrial radio access or CDMA2000. TDMA can be implemented as radio technology such as GSM (global system for mobile communications)/GPRS (general packet radio service)/EDGE (enhanced data rates for GSM evolution). OFDMA can be implemented as a radio technology such as IEEE 802.11 (Wireless Fidelity (Wi-Fi)), IEEE 802.16 (Worldwide interoperability for Microwave Access (WiMAX)), IEEE 802-20, Evolved UTRA (E-UTRA), etc. UTRA is a part of UMTS (universal mobile telecommunications system). 3GPP LTE is a part of E-UMTS (evolved UMTS) using E-UTRA, employing OFDMA for downlink and SC-FDMA for uplink. LTE-A is an evolution of 3GPP LTE.

For clarity, the following description focuses on 3GPP LTE/3GPP LTE-A. However, technical features of the present invention are not limited thereto. It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, UE (user equipment) may be fixed or have mobility and includes devices that communicate with a base station (BS) to transmit/receive user data and/or control information. The term 'UE' may be used interchangeably with terms such as 'terminal equipment', 'MS (mobile station)', 'MT (mobile terminal)', 'UT (user terminal)', 'SS (subscriber station)', 'wireless device', 'PDA (personal digital assistant)', 'wireless modem', 'handheld device', etc. A BS refers to a fixed station communicating with a UE and/or another BS and exchanges data and control information with the UE and another BS through communication. The term 'BS' may be replaced with the term 'ABS (advanced base station)', 'NB (node B)', 'eNB (evolved node B), 'BTS (base transceiver system)', 'access point', 'PS (processing server)', 'point', 'TP (transmission point)', 'RP (receipt point)', 'DL point', 'UL point', 'cell', etc.

Functions and symbols used in the specification will now be described.

M denotes a BS set and m(n) denotes a serving BS of a user n. N represents a user (UE) set and $N_m$ represents a user (or UE) set served by a BS n. X refers to a pattern set and x refers to a pattern (e.g. M-by-1 vector) belonging to the set X. Patterns represent transmit power on/off states of BSs present in a network.

Figure 1:
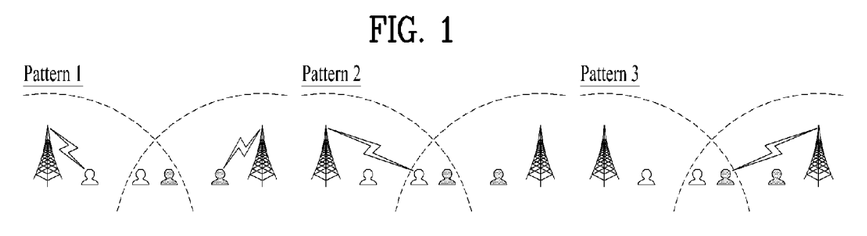
FIG. 1 illustrates exemplary on/off patterns of cells or base stations.

FIG. 1 illustrates exemplary patterns. If two base stations are present, there may be three patterns except for a state that both base stations are off. Pattern 1 in which both the base stations are on and patterns 2 and 3 in which one of the base stations is on may be present. In the case of patterns 2 and 3, one of the base stations does not perform transmission such that the other base station becomes interference-free and has high throughput. However, although resource quality (e.g. SINR) can be improved since only one of the base stations is used, the quantity of resources used in the network can be considered to decrease. Accordingly, network performance can be improved only when these patterns are appropriately used.

$r_{n,x}$: instantaneous throughput or data rate of a UE n in a pattern x (which is affected by channel state)

$\overline{R_n}$: average throughput or data rate of the UE n (which is affected by scheduling)

U(R): utility function of a network

An inter-cell interference control method based on the above-described patterns may be performed. The inter-cell interference control method is carried out such that a network utility function (i.e. utility) is maximized.

Accordingly, a pattern is selected (cell (or BS) on/off is determined) through the following equation.

$$x^*(t) = \mathrm{argmax}_{x \in X}\left[\max_{n \in N_m} U'(\overline{R}_n(t-1))r_{n,x}(t)x_m\right] \quad \text{[Equation 1]}$$

That is, a pattern x that maximizes a product of a differential value of the network utility function U'(R) and the instantaneous data rate of a user (UE) n can be selected from available patterns X.

Upon determination of the pattern according to the above equation, the user (or UE) can be scheduled through the following equation.

$$n^*_m(t) = \mathrm{argmax}_{n \in N_m} U'(\overline{R}_n(t-1))r_{n,x}*(t), \forall m \ s.t. x^*_m = 1 \quad \text{[Equation 2]}$$

Here, $n^*_m(t)$ denotes a user (or UE) n of a BS m. A UE that maximizes a product of the differential value of the network utility function and a data rate obtained when the UE is selected is selected from UEs belonging to each BS that is on in the pattern selected through the above-described pattern selection method.

However, two significant restrictions are present in determination of on/off states (i.e. determination of patterns) of BSs of the network. First of all, a central office (which may be referred to as a coordinator, controller or the like) needs to collect information (channel state, average throughput, etc.) about the network in every time slot. Furthermore, as the number of BSs in the network increases, the number of possible combinations of patterns increases to $2^M-1$.

Accordingly, an embodiment of the present invention proposes a method for controlling inter-cell interference more efficiently.

Figure 2:
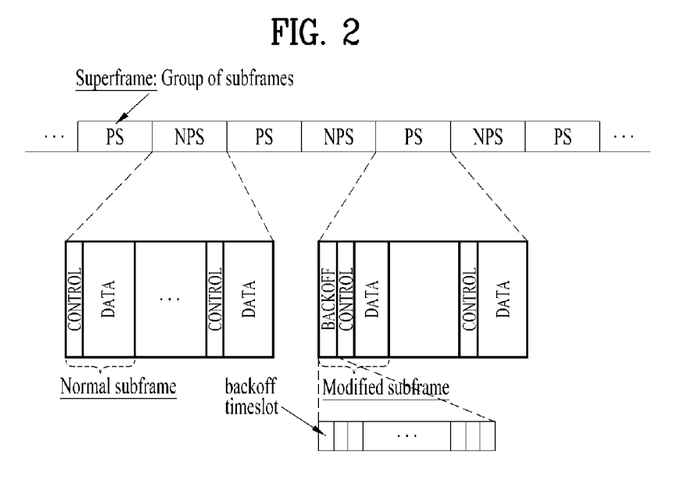
FIG. 2 illustrates a superframe structure according to an embodiment of the present invention.

FIG. 2 illustrates a frame structure used for wireless communication according to an embodiment of the present invention. A superframe is a group of subframes and includes a plurality of subframes. The superframe corresponds to a basic time unit for carrier sensing based on/off (or pattern selection) control proposed by the present invention.

The superframe can be divided into a pattern selection (PS) period in which on/off control is performed and a non-PS (NPS) period in which all base stations perform transmission without carrying out on/off control.

A subframe is a basic unit for user scheduling. Subframes include a normal subframe having a data transmission function only and a modified subframe having a back-off period in addition to the data transmission function.

The modified subframe is set in the PS period only and may be disposed at the head of the PC period. The modified subframe is used to disperse on/off control of the PS period. The back-off period of the modified subframe includes discrete back-off time slots and the duration of the back-off period may be determined by the number of back-off time slots. In addition, the PS period may be composed of modified subframes only without a data transmission period.

An object of the present invention is to maximize utility (or service satisfaction) of UEs of a network by effectively managing inter-cell interference. This is mathematically represented as follows.

$$\max_{R \in \Gamma} \sum_{n \in N} U(\overline{R}_n) \quad \text{[Equation 3]}$$

Here, function U( ) is a utility function and is defined as follows.

$$U(R) = \begin{cases} \log(R), & \text{if } \alpha = 1, \\ (1-\alpha)R^{1-\alpha}, & \text{otherwise,} \end{cases} \quad \text{[Equation 4]}$$

Here, α is a value adjusting system efficiency and fairness among UEs. UE fairness is emphasized as α increases, whereas system efficiency is emphasized as α decreases. α may be a real number greater than or equal to 0. The above equation is called an alpha proportional fair (PF) function. When only efficiency or capacity increase is emphasized in a wireless network, serving a user (or UE) close to a BS is advantageous, whereas using resources to serve a user (or UE) spaced apart from the BS is disadvantageous due to pathloss, and thus UE fairness cannot be secured. On the contrary, if only fairness is emphasized, all users are allocated the same resource, causing efficiency deterioration. Accordingly, tradeoff between fairness and efficiency is controlled using the value α. For example, when α is 0, which corresponds to a case in which efficiency is emphasized, the sum of throughputs of all users is maximized as represented in Equation 3. When α is 1, which corresponds to a case in which proportional fairness is accomplished, efficiency and fairness are satisfied to some degree. As α approaches infinity, fairness is maximized.

Carrier Sensing Based Inter-Cell Interference Control Method

Figure 3:
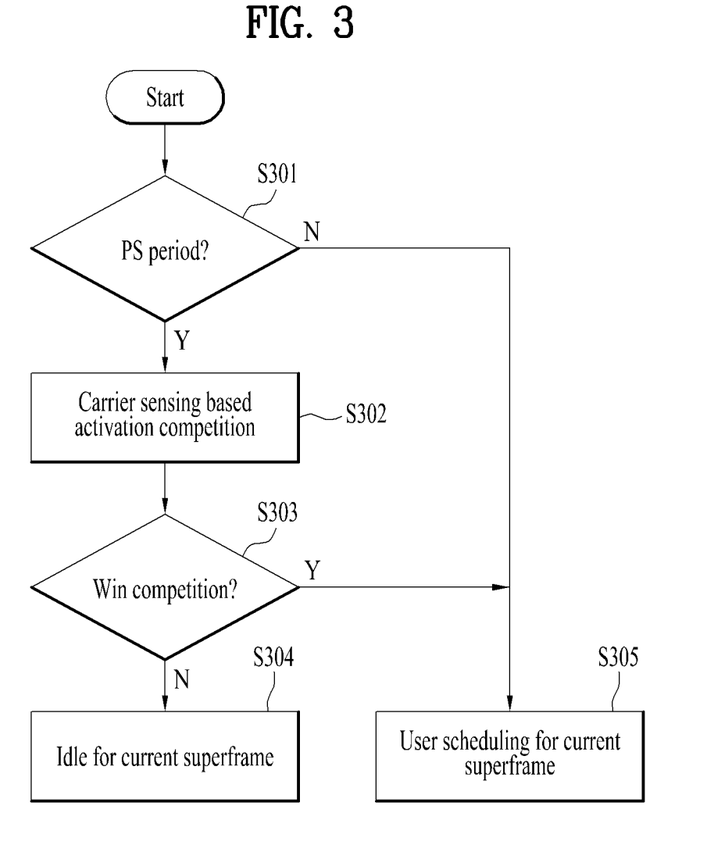
FIG. 3 is a flowchart illustrating an inter-cell interference control method according to an embodiment of the present invention.

FIG. 3 is a flowchart illustrating a carrier sensing based inter-cell interference control method according to an embodiment of the present invention.

A BS can determine whether the current superframe corresponds to a PS period when each superframe is started (S301). When the superframe does not correspond to a PS period, the BS can schedule users (UEs) served thereby without considering inter-cell interference (S305).

When the superframe corresponds to a PS period, the BS can participate in carrier sensing based activation competition (S302). Activation competition will be described below.

The BS can determine whether or not to win activation competition (S303).

When the BS wins activation competition, the BS can schedule users (or UEs) during the superframe (S305). That is, the BS can transmit a downlink signal to the users (or UEs) served thereby during the superframe. When the BS loses activation competition, the BS can maintain an idle state in which the BS does not perform downlink transmission (S304).

Carrier Sensing Based Activation Competition Method

Figure 4:
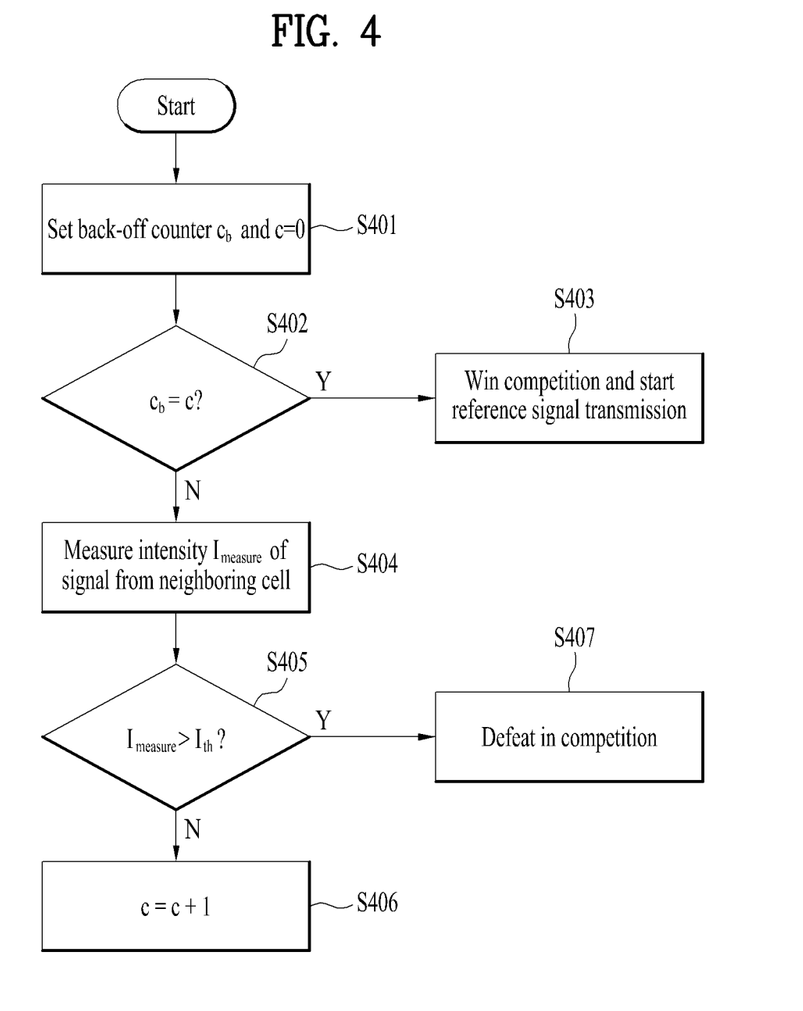
FIG. 4 is a flowchart illustrating activation competition according to an embodiment of the present invention.

FIG. 4 is a flowchart illustrating a carrier sensing based activation competition method in a PS period according to an embodiment of the present invention. A BS m can set a uniformly random back-off value $c_b$ and initialize a counter value C in a period $(0, 2\lambda_m)$ upon initiation of carrier sensing based activation competition (S401). Here, $\lambda_m$ is a value determined based on a weight $w_m$ for indicating transmission request of a cell and is determined by the following equation.

A) Back-Off Value Decision Method $$\lambda_m = e^{-w_m(\tau)} \quad \text{[Equation 5]}$$

In this equation, $w_m(\tau)$ is a weight of the base station m and is updated according to the following equation.

B) Cell (BS)-Specific Weight Decision/Update Method $$w_m(\tau) = \sum_{n \in N_m} U'(\overline{R}_n) r_{n,PS} \quad \text{[Equation 6]}$$

In this equation, U'( ) is the differential value of the utility function and $r_{n,PS}$ is an instantaneous throughput or data rate of a user (or UE) that can be obtained in the PS period (that is served by the BS m). A product of a direction (differential value of utility function) in which utility is maximized and the quantity ($r_{n,PS}$) that can move in the direction is used as the cell-specific weight.

Accordingly, $\lambda_m$ in Equation 5 decreases as the cell-specific weight increases and thus the back-off value is selected within a narrower range.

The BS m can determine whether the counter value is equal to the set back-off value $c_b$ (S402). If the counter value is not equal to the set back-off value $c_b$, the BS m can measure the intensity $I_{measure}$ of a signal received from a neighboring cell (S404).

The BS m can determine whether the measurement value $I_{measure}$ exceeds a threshold value $I_{th}$ (S405). If the measurement value $I_{measure}$ exceeds the threshold value $I_{th}$, it is determined that the BS m lost competition (S407). If the measurement value $I_{measure}$ is less than the threshold value $I_{th}$, the BS m can increase the counter value C by 1 (S406). Then, the BS m can return to S402 and perform the above-described operation as shown in FIG. 4.

That is, the BS m compares a measurement value $I_{measure}$ corresponding to the sum of intensities of a signal repeatedly coming from a neighboring cell during a period corresponding to the determined back-off value $c_b$ to the threshold value $I_{th}$. When the measurement value exceeds the threshold value, this represents that the BS has lost competition. When the measurement value is less than the threshold value and the BS waits for a time corresponding to the back-off value, this represents that the BS has won the competition. When the BS has won the competition, the BS starts to transmit a reference signal in a manner of signaling victory to other cells.

Accordingly, since a time in which the measurement value needs to be less than the threshold value decreases as the back-off value $c_b$ decreases, priority in the activation competition increases. It can be seen from Equation 5 for back-off value decision for determining $\lambda_m$ related to the back-off value that the back-off value decreases as the cell-specific weight increases. Upon completion of carrier sensing based activation competition, that is, end of a back-off period of a modified subframe, only a base station that won the competition can perform UE scheduling during the current superframe, as described with reference to FIG. 3.

UE Scheduling Method

In scheduling according to an NPS period and scheduling performed by a base station that won competition in a PS period, a UE is selected according to the following equation.

C) User Scheduling Method $$n^*_m(t)=\text{argmax}_{n \in N_m} U'(\overline{R}_n(t-1))r_n(t), \forall m \in M_{activation}(t) \quad [\text{Equation 7}]$$

Here, $r_n(t)$ denotes instantaneous throughput or data rate of a user n and $n^*_m(t)$ is selected by a BS $M_{activation}(t)$ only, which is active in the current timeslot. $\overline{R}_n(t)$, which represents the average throughput of the UE n, calculates the average value through exponential smoothing, as represented by the following equation.

D) Average Throughput Decision/Update Method $$\overline{R}_n(t+1)=(1-\beta)\overline{R}_n(t)+\beta r_n(t), \forall n \in N_m \quad [\text{Equation 8}]$$

Here, $0<\beta\ll1$.

Inter-cell interference management can be performed for each BS, as illustrated in FIG. 3, according to the above-described carrier sensing based activation competition method and UE scheduling operations.

PS/NPS Period Setting Method

Setting of a PS/NPS period to be used by all BSs in a network can be updated based on information reported by each BS to the central office. The information is utility gradients that the BS m suffers in a PS period and an NPS period and corresponds to $\Delta_{m,PS}=\Sigma_{n \in N_m} U'(\overline{R}_n)r_{n,PS}$ and $\Delta_{m,NPS}=\Sigma_{n \in N_m} U'(\overline{R}_n)r_{n,NPS}$.

Accordingly, overall network utility is maximized when one of the PS period and NPS period, which corresponds to higher gradient, has a higher rate.

It is assumed that the duration of the current normalized PS period is $\theta$ and the duration of the NPS period is $1-\theta$. The central office updates $\theta$ through the following algorithm, generates a map of PS/NPS periods such that the ratio of the PS period to the NPS period is satisfied and signals the map to all BSs.

E) PS/NPS Map Decision Method $$\theta \leftarrow \frac{\theta + \gamma \sum_m \Delta_{m,PS}}{1 + \gamma \sum_m (\Delta_{m,NPS} + \Delta_{m,PS})}, \quad [\text{Equation 9}]$$

-continued $$1-\theta \leftarrow \frac{1-\theta + \gamma \sum_m \Delta_{m,NPS}}{1 + \sum_m \gamma(\Delta_{m,NPS} + \Delta_{m,PS})}$$

This represents a value obtained by updating the durations of the PS period and NPS period in a gradient multiplied by a scaling factor of $0<\gamma\ll1$ and then normalizing the sum of the two durations to 1. Here, UE fairness decreases as the duration of the NPS period increases, whereas efficiency decreases while UE fairness increases as the duration of the PS period increases.

According to the above-described embodiments of the present invention, users (UEs) which are present at a cell edge and vulnerable to interference can have improved throughput.

Figure 5:
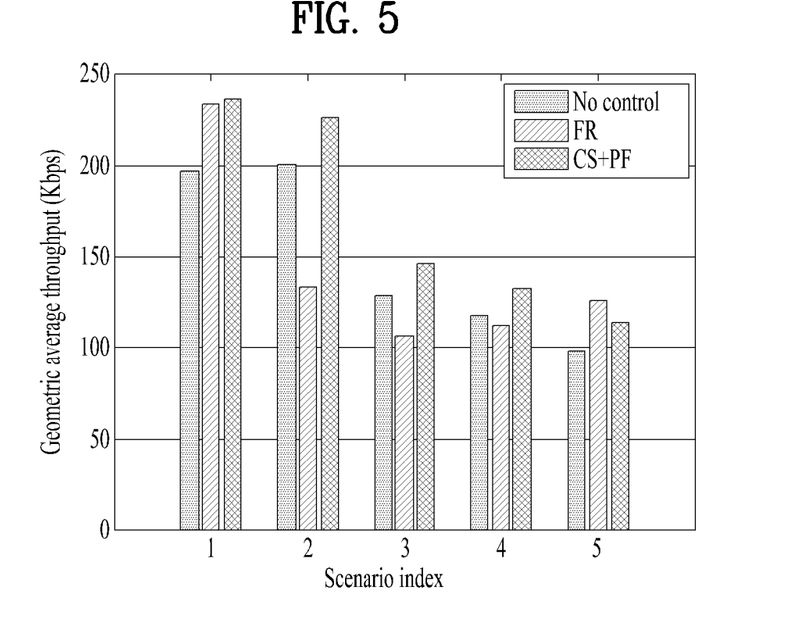
FIG. 5 illustrates simulation results according to an embodiment of the present invention and a conventional method.
Figure 6:
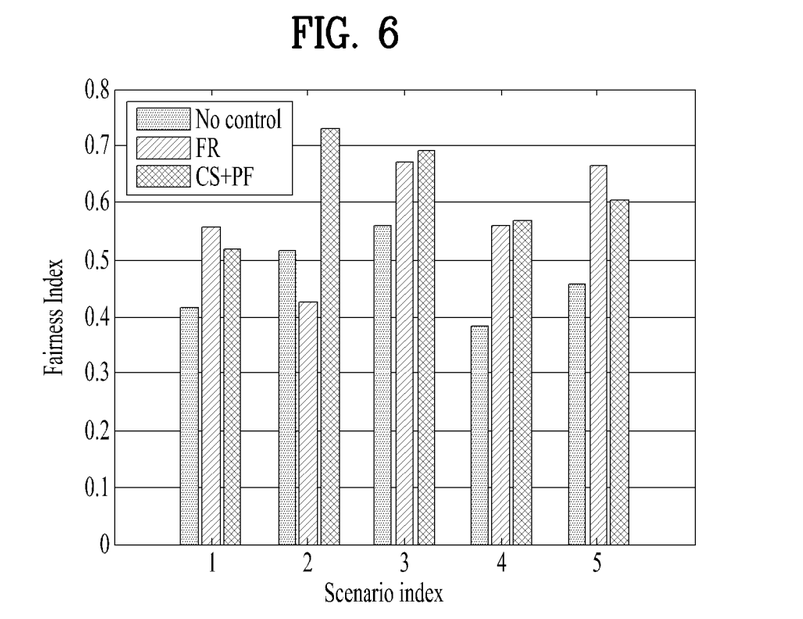
FIG. 6 illustrates simulation results according to an embodiment of the present invention and a conventional method.

FIGS. 5 and 6 illustrate results of simulations to which embodiments of the present invention are applied. FIG. 5 shows geometric average throughput of a user for small cell network scenario. In FIG. 5, "No control" refers to a case in which control is not performed, "FR" refers to a case in which interference is controlled through frequency reuse, and "CS+PF" refers to a case in which interference control is performed according to carrier sensing based activation competition when $\alpha=1$ in the proportional fair function. High performance is achieved in all but the fifth scenario.

Referring to FIGS. 5 and 6, fairness or average throughput is increased by assigning a higher data rate to a user located at a cell edge according to the embodiments of the present invention. In FIG. 6, UE fairness increases as fairness approaches 1.

Figure 7:
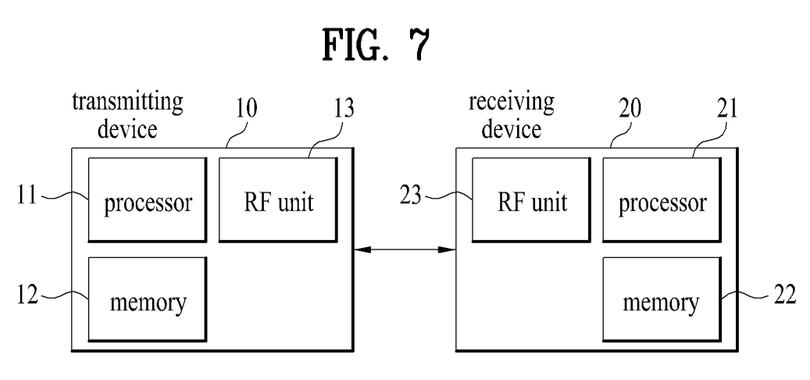
FIG. 7 is a block diagram of an apparatus for implementing an embodiment of the present invention.

FIG. 7 is a block diagram of an apparatus configured to perform uplink transmission related operation according to an embodiment of the present invention. A transmitter 10 and a receiver 20 respectively include radio frequency (RF) units 13 and 23 capable of transmitting or receiving radio signals carrying information and/or data, signals, messages, etc., memories 12 and 22 storing information related to communication in a wireless communication system, and processors 11 and 21 operatively connected to components such as the RF units 13 and 23 and the memories 12 and 22 and configured to control the components such that the apparatus implements at least one of the above-described embodiments of the present invention.

The memories 12 and 22 may store programs for processing and control of the processors 11 and 21 and temporarily store input/output information. The memories 12 and 22 may serve as a buffer.

The processors 11 and 21 control the overall operations of modules in the transmitter and receiver. Particularly, the processors 11 and 21 can execute various control functions to implement the present invention. The processors 11 and 21 may be called controllers, microcontrollers, microprocessors, microcomputers, etc. The processors 11 and 21 may be implemented by hardware, firmware, software, or a combination thereof. In hardware implementation, ASICs (application specific integrated circuits), DSPs (digital signal processors), DSPDs (digital signal processing devices), PLDs (programmable logic devices), FPGAs (field programmable gate arrays), etc. configured to implement the present invention may be included in the processors 11 and 21. In a firmware or software configuration, the embodiments of the present invention may be implemented in the form of a module, a procedure, a function, etc. Firmware or software configured to implement the present invention may be included in the processors 11 and 21 or stored in the memories 12 and 22 and executed by the processors 11 and 21.

The processor 11 of the transmitter 10 performs predetermined coding and modulation on a signal and/or data, which are scheduled by the processor 11 or a scheduler connected to the processor 11 and transmitted to the outside, and transmits the modulated signal and/or data to the RF unit 13. For example, the processor 11 converts a data stream to be transmitted into K layers through demultiplexing, channel coding, scrambling, modulation, etc. The coded data stream is called a codeword and is equivalent to a transport block corresponding to a data block provided by a medium access control (MAC) layer. A transport block (TB) is coded into a codeword and each codeword is transmitted to the receiver in the form of one or more layers. The RF unit 13 may include an oscillator for frequency upconversion. The RF unit 13 may include Nt (Nt being a positive integer) transmit antennas.

A signal processing procedure of the receiver 20 is reverse to the signal processing procedure of the transmitter 10. The RF unit 23 of the receiver 20 receives a radio signal transmitted by the transmitter 10 under the control of the processor 21. The RF unit 23 may include Nr (Nr being a positive integer) receive antennas. The RF unit 23 frequency-down-converts signals received through the receive antennas into a baseband signal. The RF unit 23 may include an oscillator for frequency downconversion. The processor 21 may decode and demodulate a radio signal received through the receive antennas to restore data transmitted by the transmitter 10.

The RF units 13 and 23 include one or more antennas. The RF units correspond to the above-described network modules. The antennas transmit signals processed by the RF units 13 and 23 to the outside under the control of the processors 11 and 21 according to an embodiment of the present invention or receive external radio signals and deliver the received signals to the RF units 13 and 23. The antennas may also be called antenna ports. Each antenna may correspond to a physical antenna or may be configured according to a combination of physical antenna elements. A signal transmitted from each antenna cannot be decomposed by the receiver 20. A reference signal (RS) transmitted corresponding to an antenna defines an antenna from the viewpoint of the receiver 20 and enables the receiver 20 to perform channel estimation for the antenna irrespective of whether a corresponding channel is a single radio channel from a physical antenna or a composite channel from a plurality of physical antenna elements including the antenna. That is, the antenna is defined such that a channel transferring a symbol on the antenna can be derived from a channel transferring another symbol of the same antenna. An RF unit supporting MIMO (multiple input multiple output) for transmitting/receiving data using multiple antennas can be connected to two or more antennas.

In embodiments of the present invention, a UE or a relay operates as the transmitter 10 on uplink and operates as the receiver 20 on downlink. In embodiments of the present invention, a BS operates as the receiver 20 on uplink and operates as the transmitter 10 on downlink.

The UE or BS functioning as the receiver or transmitter can be implemented such that the embodiments of the present invention described above with reference to the attached drawings can be independently applied or two or more embodiments can be simultaneously applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is made, centering on a data transmission and reception relationship between a BS and a UE. A specific operation described as performed by the BS may be performed by an upper node of the BS. That is, it is apparent that, in a network composed of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'Mobile Station (MS)', 'Mobile Subscriber Station (MSS)', 'Subscriber Station (SS)', etc.

The embodiments of the present invention may be achieved by various means, for example, hardware, firmware, software, or a combination thereof. In a hardware configuration, the methods according to the embodiments of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The above-described embodiments of the present invention can be applied to various mobile communication systems such as a UE, a relay, a BS, etc.

What is claimed is:

1. A method for controlling inter-cell interference in a wireless communication system, which is performed by a base station (BS), the method comprising:
receiving information about an interference control period from a central controller;
performing carrier sensing based activation competition in the interference control period; and
scheduling user equipments served by the BS if the BS wins the carrier sensing based activation competition,
wherein the carrier sensing based activation competition is based on a BS-specific back-off value related to a BS-specific weight, and
wherein the BS-specific weight is determined as the sum of products of an instantaneous throughput and a differential value of an average throughput based utility function, for all UEs served by the BS.

2. The method according to claim 1,
wherein the BS-specific back-off value is randomly selected in a period having a specific length,
wherein the period having the specific length decreases as the BS-specific weight increases.

3. The method according to claim 1, wherein the period is $(0, 2\lambda_m)$ wherein $\lambda_m$ is a BS-specific value, $\lambda_m = e^{-w_m(\tau)}$ and $w(\tau)$ corresponds to the BS-specific weight in a superframe $\tau$.

4. The method according to claim 1, wherein the BS-specific weight is determined as $$w(\tau) = \sum_{n \in N} U'(\overline{R}_n) r_{n,PS},$$

wherein $w(\tau)$ denotes the BS-specific weight in a superframe $\tau$, N denotes a set of UEs served by the BS, n represents a UE in the UE set, $$U(\overline{R}_n) = \begin{cases} \log(\overline{R}_n), & \text{if } \alpha = 1, \\ (1-\alpha)\overline{R}_n^{1-\alpha}, & \text{otherwise,} \end{cases}$$

$\overline{R}_n$ represents the average throughput of the UE n, $\alpha$ is a constant and $r_{n,PS}$ is the instantaneous throughput of the UE n in the interference control period.

5. The method according to claim 1, wherein performing of the carrier sensing based activation competition comprises determining whether the intensity of a reference signal received from at least one neighboring BS exceeds a threshold value,
wherein, if the intensity of the reference signal received from the at least one neighboring BS does not exceed the threshold value for a time corresponding to the BS-specific back-off value, it is determined that the BS wins the activation competition.

6. The method according to claim 1, wherein if at least one neighboring BS is defeated in the carrier sensing based activation competition, the at least one neighboring BS maintains an idle state.

7. The method according to claim 1,
wherein the information about the interference control period is determined based on information about gradients of utility function in a period in which interference control is performed (hereinafter, "control period") and gradients of utility function in a period in which interference control is not performed (hereinafter, "no-control period"), at each BS in the wireless communication system,
wherein the interference control period is determined such that one having a higher gradient between the control period and the no-control period is set more frequently in the interference control period.

8. The method according to claim 7,
wherein information about the gradient of utility function of a BS (m) in the period in which interference control is performed corresponds to $\Delta_{m,PS} = \Sigma_{n \in N_m} U'(\overline{R}_n) r_{n,PS}$, and information about the gradient of utility function of the BS (m) in the period in which interference control is not performed corresponds to $\Delta_{m,PS} = \Sigma_{n \in N_m} U'(\overline{R}_n) r_{n,PS}$,
wherein $N_m$ denotes a set of UEs served by the BS (m), n denotes a UE in the UE set, $$U(\overline{R}_n) = \begin{cases} \log(\overline{R}_n), & \text{if } \alpha = 1, \\ (1-\alpha)\overline{R}_n^{1-\alpha}, & \text{otherwise,} \end{cases}$$

$\overline{R}_n$ is the average throughput of the UE n, $\alpha$ is a constant, $r_{n,PS}$ is an instantaneous throughput of the UE (n) in the period in which interference control is performed, and $r_{n,PS}$ is an instantaneous throughput of the UE (n) in the period in which interference control is not performed.

9. The method according to claim 8,
wherein the period $\theta$ in which interference control is performed and the period $1-\theta$ in which interference control is not performed are updated as $$\theta \leftarrow \frac{\theta + \gamma \sum_m \Delta_{m,PS}}{1 + \gamma \sum_m (\Delta_{m,NPS} + \Delta_{m,PS})}, 1-\theta \leftarrow \frac{1-\theta + \gamma \sum_m \Delta_{m,NPS}}{1 + \sum_m \gamma(\Delta_{m,NPS} + \Delta_{m,PS})},$$

wherein $\gamma$ is a scaling factor and $0<\gamma\ll 1$.

10. A base station (BS) for controlling inter-cell interference in a wireless communication system, the BS comprising:
a radio frequency (RF) unit; and
a processor configured to control the RF unit,
wherein the processor is configured to receive information about an interference control period from a central controller, to perform carrier sensing based activation competition in the interference control period and to schedule user equipments served by the BS if the BS wins the carrier sensing based activation competition,
wherein the carrier sensing based activation competition is based on a BS-specific back-off value related to a BS-specific weight, and
wherein the BS-specific weight is determined as the sum of products of an instantaneous throughput and a differential value of an average throughput based utility function, for all UEs served by the BS.

11. The BS according to claim 10,
wherein the BS-specific back-off value is randomly selected in a period having a specific length,
wherein the period having the specific length decreases as the BS-specific weight increases.

12. The BS according to claim 10, wherein the period is $(0, 2\lambda_m)$ wherein $\lambda_m$ is a BS-specific value, $\lambda_m = e^{-w_m(\tau)}$ and $w(\tau)$ corresponds to the BS-specific weight in a superframe $\tau$.

13. The BS according to claim 10,
wherein the BS-specific weight is determined as $$w(\tau) = \sum_{n \in N} U'(\overline{R}_n) r_{n,PS},$$

wherein w(τ) denotes the BS-specific weight in a superframe τ, N denotes a set of UEs served by the BS, n represents a UE in the UE set, $$U(\overline{R}_n) = \begin{cases} \log(\overline{R}_n), & \text{if } \alpha = 1, \\ (1-\alpha)\overline{R}_n^{1-\alpha}, & \text{otherwise,} \end{cases}$$

$\overline{R}_n$ represents the average throughput of the UE (n), α is a constant and $r_{n,PS}$ is the instantaneous throughput of the UE (n) in the interference control period.

14. The BS according to claim 10,
wherein the processor is configured to determine whether the intensity of a reference signal received from a neighboring BS exceeds a threshold value,
wherein, if the intensity of the reference signal received from the neighboring BS does not exceed the threshold value for a time corresponding to the BS-specific back-off value, it is determined that the BS wins the activation competition.

15. The BS according to claim 10, wherein if at least one neighboring BS is defeated in the carrier sensing based activation competition, the at least one neighboring BS maintains an idle state.

16. The BS according to claim 10,
wherein the information about the interference control period is determined based on information about gradient of utility function in a period in which interference control is performed (hereinafter, "control period") and gradient of utility function in a period in which interference control is not performed (hereinafter, "no-control period"), at each BS in the wireless communication system,
wherein the interference control period is determined such that one having a higher gradient between the control period and the no-control period is set more frequently in the interference control period.

17. The BS according to claim 16,
wherein information about the gradient of utility function of a BS (m) in the period in which interference control is performed corresponds to $\Delta_{m,PS} = \sum_{n \in N_m} U'(\overline{R}_n) r_{n,PS}$, and information about the gradient of utility function of the BS (m) in the period in which interference control is not performed corresponds to $\Delta_{m,PS} = \sum_{n \in N_q} U'(\overline{R}_n) r_{n,PS}$,
wherein $N_m$ denotes a set of UEs served by the BS (m), n denotes a UE in the UE set, $$U(\overline{R}_n) = \begin{cases} \log(\overline{R}_n), & \text{if } \alpha = 1, \\ (1-\alpha)\overline{R}_n^{1-\alpha}, & \text{otherwise,} \end{cases}$$

$\overline{R}_n$ is the average throughput of the UE (n), α is a constant, $r_{n,PS}$ is instantaneous throughput of the UE (n) in the period in which interference control is performed, and $r_{n,PS}$ is instantaneous throughput of the UE (n) in the period in which interference control is not performed.

18. The BS according to claim 17,
wherein the period θ in which interference control is performed and the period 1−θ in which interference control is not performed are updated as $$\theta \leftarrow \frac{\theta + \gamma \sum_m \Delta_{m,PS}}{1 + \gamma \sum_m (\Delta_{m,NPS} + \Delta_{m,PS})}, \quad 1-\theta \leftarrow \frac{1-\theta + \gamma \sum_m \Delta_{m,NPS}}{1 + \sum_m \gamma(\Delta_{m,NPS} + \Delta_{m,PS})},$$

wherein γ is a scaling factor and 0<γ<<1.

* * * * *